No. 754,438. PATENTED MAR. 15, 1904.
G. B. EVANS & J. H. WILLIAMS.
LOCK NUT.
APPLICATION FILED DEC. 19, 1903.
NO MODEL.
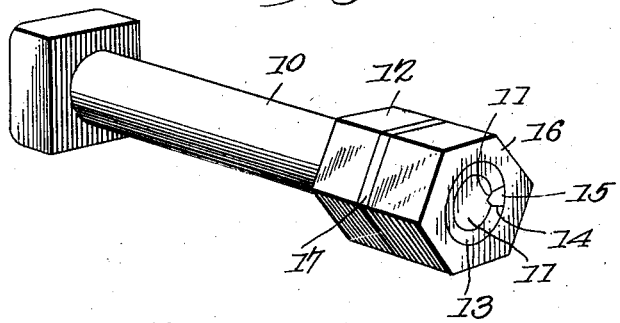
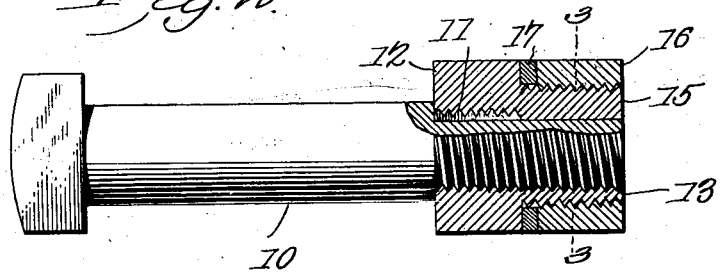
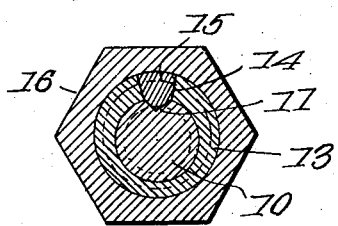
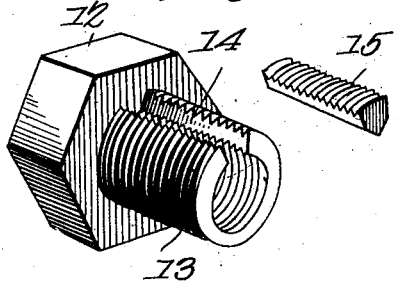
Witnesses
E. F. Stewart
C. H. Woodward
George B. Evans and
James H. Williams
Inventors
by C. A. Snow & Co.
Attorneys No. 754,438. Patented March 15, 1904.

UNITED STATES PATENT OFFICE.

GEORGE B. EVANS AND JAMES H. WILLIAMS, OF DODGEVILLE, WISCONSIN.

LOCK-NUT.

SPECIFICATION forming part of Letters Patent No. 754,438, dated March 15, 1904.

Application filed December 19, 1903. Serial No. 185,884. (No model.)

*To all whom it may concern:*

Be it known that we, GEORGE B. EVANS and JAMES H. WILLIAMS, citizens of the United States, residing at Dodgeville, in the county of Iowa and State of Wisconsin, have invented a new and useful Lock-Nut, of which the following is a specification.

This invention relates to nuts constructed to withstand backward movement upon their bolts, and has for its object to improve the construction of such devices and produce a nut simple in construction, easily applied and operated, and which will effectually hold the nut from all backward movement, no matter how severe the jarring or concussion may be.

The invention consists in certain novel features of construction, as hereinafter shown and described, and specified in the claims.

In the drawings illustrative of the invention, in which corresponding parts are denoted by like designating characters, Figure 1 is a perspective view of the device. Fig. 2 is a longitudinal sectional elevation. Fig. 3 is a transverse section on the line 3 3 of Fig. 2. Fig. 4 is a perspective view of the main nut and the threaded key detached.

The improved device may be applied to any size of bolt 10, and the latter will be provided with a longitudinal channel 11 transversely of its threads.

The main portion 12 of the nut will be of the ordinary form and with the threaded aperture preferably eccentric of its diameter, as shown.

The nut is provided with an extension 13, internally threaded in conformity with the threads of the bolt and with its external diameter eccentric to the aperture of the nut and the extension, the latter being externally threaded reversely to the threads of the bolt and nut and the internal threads of the extension and provided with a longitudinal aperture 14 through its thicker part, as shown. Fitting the aperture 14 is a key 15, the inner side of the key being V-shaped for engagement with the channel 11 and its outer side threaded in conformity with the threads of the extension 13. The sides of the aperture 14 are inwardly inclined, and the sides of the key are correspondingly inclined, so that the inward movement of the key will be limited to maintain it in proper position relative to the extension.

Engaging the extension 13 is a clamp-nut 16, and preferably disposed between the nuts is a washer 17, of relatively soft metal, such as soft brass, copper, or the like. By this simple arrangement when the nut 12 is set "home" as far as required it is turned until the aperture 14 comes opposite the channel 11. The key 15 and washer 17 are then inserted and the left-hand threaded clamp-nut 16 screwed upon the extension and tightened against the washer. By this simple means, the extension 13 and its nut 16 being reversely threaded to the bolt 10 and its nut 12, any tendency to backward movement of the nut 12 will be efficiently resisted by the clamp-nut. Thus the nut 12 will be very firmly held in position and its working loose rendered impossible, while at the same time releasable by reversely turning of the clamp-nut with a wrench or other implement.

By forming the threaded aperture in the nut 12 and extension 13 eccentric thereto the area of the side walls of the aperture 14 is materially increased, so that a key of correspondingly larger area may be employed, thus increasing the strength without increase of expense or weight.

The device may be applied to any size or form of bolt and nut and employed in connection with any structure requiring such devices.

The relatively soft metal washer 17 is an important feature of the invention, as it greatly increases the "grip" between the nuts without material increase in expense and may be employed when required.

A plurality of the channels 11 may be employed, if required; but this would not be a departure from the principle of the invention.

Having thus described the invention, what is claimed is—

1. In a lock-nut, the combination of a bolt having a longitudinal channel transversely of the threads, a nut engaging said threads and having an extension internally threaded to conform to the threads of the nut and externally threaded reversely to the threads of the bolt and nut and provided with a radial transverse aperture, a key for engagement with said aperture and extending into the channel in said bolt and externally threaded to conform to the external threads on said extension, and a clamp-nut engaging said extension, substantially as described.

2. In a lock-nut, the combination of a bolt having a longitudinal channel transversely of the threads, a nut engaging said threads and having an extension internally threaded to conform to the threads of the nut and with its exterior eccentric to the bore of the nut and externally threaded reversely to the threads of the bolt and nut, said extension having a radial aperture transversely of its threads, a key for engagement with said aperture and extending into the channel in said bolt and externally threaded in conformity with the external threads of said extension, and a clamp-nut engaging said extension, substantially as described.

3. In a lock-nut, the combination of a bolt having a longitudinal channel transversely of the threads, a nut engaging said threads and having an extension internally threaded to conform to the threads of the nut and externally threaded reversely to the threads of the bolt and nut and provided with a radial transverse aperture, a key for engagement with said apertures and extending into the channel in said bolt and externally threaded to conform to the external threads on said extension, a clamp-nut engaging said extension, and a relatively soft metal washer between said nuts, substantially as described.

In testimony that we claim the foregoing as our own we have hereto affixed our signatures in the presence of two witnesses.

GEORGE B. EVANS.
JAMES H. WILLIAMS.

Witnesses:
ROY C. SMELKER,
J. P. SMELKER.